US012392664B2

(12) United States Patent
You et al.

(10) Patent No.: US 12,392,664 B2
(45) Date of Patent: Aug. 19, 2025

(54) IR SENSOR WITH NANO-STRUCTURE

(71) Applicant: SAMSUNG ELECTRONICS CO., LTD., Suwon-si (KR)

(72) Inventors: Jangwoo You, Suwon-si (KR); Jinmyoung Kim, Suwon-si (KR); Wontaek Seo, Suwon-si (KR); Byonggwon Song, Suwon-si (KR); Yongseop Yoon, Suwon-si (KR); Duhyun Lee, Suwon-si (KR); Choongho Rhee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 309 days.

(21) Appl. No.: 18/214,026

(22) Filed: Jun. 26, 2023

(65) Prior Publication Data
US 2024/0230412 A1    Jul. 11, 2024

(30) Foreign Application Priority Data
Jan. 6, 2023    (KR) ........................ 10-2023-0002503

(51) Int. Cl.
*G01J 5/02*    (2022.01)
*G01J 5/0806*    (2022.01)
*G01K 7/01*    (2006.01)

(52) U.S. Cl.
CPC ............. *G01J 5/023* (2013.01); *G01J 5/0806* (2013.01); *G01K 7/01* (2013.01)

(58) Field of Classification Search
CPC .. G01J 5/023; G01J 5/0806; G01J 5/20; G01J 5/024; G01J 5/0853; G01J 5/10; G01J 5/48; G01K 7/01
See application file for complete search history.

(56) References Cited

U.S. PATENT DOCUMENTS 9,945,729 B2    4/2018    Cannata et al.
11,215,510 B2 *   1/2022   Kobayashi ............... G01J 5/06

FOREIGN PATENT DOCUMENTS

| KR | 10-2012-0080965 A | 7/2012 |
| KR | 10-2017-0122647 A | 11/2017 |
| KR | 10-2020-0132467 A | 11/2020 |
| KR | 10-2021-0052971 A | 5/2021 |

(Continued)

OTHER PUBLICATIONS

Yu Zhou et al., "Ultra-broadband metamaterial absorbers from long to very long infrared regime", Light: Science & Applications, vol. 10, No. 1, Article No. 138, Jul. 5, 2021, 12 pages, DOI: 10.1038/s41377-021-00577-8.

(Continued)

*Primary Examiner* — David P Porta
*Assistant Examiner* — Gisselle M Gutierrez
(74) *Attorney, Agent, or Firm* — Sughrue Mion, PLLC

(57) ABSTRACT

An infrared sensor includes a substrate, a reflective layer on an upper surface of the substrate, and a composite layer including an absorption layer including a nanostructure and configured to absorb light energy and a sensing layer including a plurality of temperature sensing cells, where the composite layer is above the upper surface of the substrate, and where the infrared ray sensor further includes a resonant cavity between the composite layer and the reflective layer.

20 Claims, 15 Drawing Sheets

(56) References Cited

FOREIGN PATENT DOCUMENTS

KR          10-2358860 B1     2/2022
WO      WO2021182813 A2 *  9/2021    ................ G01J 5/20

OTHER PUBLICATIONS

Kadir Üstun et al., "Ultra-broadband long-wavelength infrared metamaterial absorber based on a double-layer metasurface structure", Journal of the Optical Society of America B, vol. 34, No. 2, Jan. 26, 2017, pp. 456-462, DOI: 10.1364/JOSAB.34.000456.

* cited by examiner

FIG. 7

| WAVELENGTH (μm) | NANO-DISK (191) THICKNESS (nm) | | | | | |
|---|---|---|---|---|---|---|
| | 10 | 20 | 30 | 40 | 50 | 60 |
| 8 | 0.696517 | 0.664145 | 0.649229 | 0.640611 | 0.634697 | 0.629918 |
| 9 | 0.769706 | 0.771549 | 0.775182 | 0.779202 | 0.782855 | 0.78583 |
| 10 | 0.725458 | 0.747837 | 0.76447 | 0.778248 | 0.790015 | 0.800226 |
| 10 | 0.958278 | 0.947999 | 0.941586 | 0.936581 | 0.932371 | 0.928738 |
| | 0.978329 | 0.971367 | 0.966514 | 0.962604 | 0.959146 | 0.955948 |
| | 0.97761 | 0.984405 | 0.987405 | 0.989056 | 0.989911 | 0.990248 |
| 11 | 0.978645 | 0.987838 | 0.991701 | 0.993671 | 0.994651 | 0.995053 |
| | 0.9806 | 0.98744 | 0.989386 | 0.989699 | 0.98925 | 0.988408 |
| 12 | 0.985806 | 0.98702 | 0.985114 | 0.89238 | 0.979393 | 0.976416 |
| | 0.992328 | 0.988822 | 0.983634 | 0.978284 | 0.973114 | 0.968247 |
| 13 | 0.994529 | 0.988972 | 0.982102 | 0.975336 | 0.968963 | 0.963016 |
| | 0.992095 | 0.985901 | 0.97824 | 0.970839 | 0.963814 | 0.957265 |
| 14 | 0.980175 | 0.973981 | 0.966158 | 0.958641 | 0.951493 | 0.94478 |
| AVERAGE ABSORPTION RATE | 0.923852 | 0.922098 | 0.920055 | 0.918089 | 0.916129 | 0.914161 |

FIG. 9

| WAVELENGTH (μm) | NANO-RING (192) THICKNESS (nm) | | | | | |
|---|---|---|---|---|---|---|
| | 10 | 20 | 30 | 40 | 50 | 60 |
| 8 | 0.872431 | 0.948104 | 0.941632 | 0.917135 | 0.889118 | 0.861429 |
| 9 | 0.870377 | 0.950581 | 0.971648 | 0.974586 | 0.970135 | 0.962107 |
| 10 | 0.754743 | 0.808346 | 0.840414 | 0.863892 | 0.882564 | 0.897997 |
| 10 | 0.964666 | 0.92949 | 0.900561 | 0.877116 | 0.857871 | 0.841831 |
| 11 | 0.996582 | 0.993352 | 0.973087 | 0.951536 | 0.931779 | 0.914227 |
| 11 | 0.977662 | 0.993535 | 0.988546 | 0.978613 | 0.967717 | 0.957071 |
| 11 | 0.967957 | 0.977929 | 0.972431 | 0.962906 | 0.952464 | 0.94218 |
| 12 | 0.96668 | 0.96606 | 0.95506 | 0.941836 | 0.92857 | 0.915998 |
| 12 | 0.974559 | 0.961383 | 0.942233 | 0.923601 | 0.90505 | 0.888666 |
| 13 | 0.986887 | 0.969046 | 0.944344 | 0.920009 | 0.897565 | 0.877285 |
| 13 | 0.992975 | 0.978035 | 0.951623 | 0.924483 | 0.899097 | 0.876024 |
| 14 | 0.993192 | 0.987059 | 0.961792 | 0.933464 | 0.906151 | 0.88097 |
| 14 | 0.985577 | 0.994969 | 0.973712 | 0.945561 | 0.916994 | 0.89002 |
| AVERAGE ABSORPTION RATE | 0.946484 | 0.958299 | 0.947468 | 0.931857 | 0.915775 | 0.900447 |

IR SENSOR WITH NANO-STRUCTURE

CROSS-REFERENCE TO RELATED APPLICATION

This application is based on and claims priority under 35 U.S.C. § 119 to Korean Patent Application No. 10-2023-0002503, filed on Jan. 6, 2023, in the Korean Intellectual Property Office, the disclosure of which is incorporated by reference herein in its entirety.

BACKGROUND

1. Field

The disclosure relates to an infrared ray sensor.

2. Description of the Related Art

Infrared ray sensors are used in thermal image cameras and the like. An infrared ray sensor measures an amount of infrared ray radiation emitted from an object. A bolometer may be used as an infrared ray sensor. A bolometer measures a temperature of an object by absorbing radiant energy in an infrared ray band emitted from the object, converting it into thermal energy, and electrically measuring a change in resistance according to a value of thermal energy. A sensing layer of the bolometer may be positioned apart from a substrate on which a reflective layer is formed, and a thickness of a resonance cavity between the sensing layer and the reflective layer may be ¼ of a wavelength. The resonance cavity may be formed such that, after forming a sacrificial layer corresponding to the thickness of the cavity on the reflective layer, the sensing layer and an absorption layer may be formed on the sacrificial layer, and the sacrificial layer may be removed. As the wavelength of incident light increases, the thickness of the resonance cavity also increases. Thus, the thickness of the sacrificial layer is very large, and there may be a difficulty in performing a thin film process for forming the sensing layer and the absorption layer on the thick sacrificial layer.

SUMMARY

Provided is an infrared ray sensor that is easy to manufacture and an electronic apparatus employing the same.

Further, provided is an infrared ray sensor including a cavity with a relatively small thickness and an electronic apparatus employing the infrared ray sensor.

Additional aspects will be set forth in part in the description which follows and, in part, will be apparent from the description, or may be learned by practice of the presented embodiments of the disclosure.

According to an aspect of the disclosure, an infrared sensor may include a substrate, a reflective layer on an upper surface of the substrate, and a composite layer including an absorption layer including a nanostructure and configured to absorb light energy and a sensing layer including a plurality of temperature sensing cells, where the composite layer may be above the upper surface of the substrate, and where the infrared ray sensor may include a resonant cavity between the composite layer and the reflective layer.

A height of the resonant cavity may be less than ¼ of a wavelength of incident light.

A height of the resonant cavity may be about 2 μm or less.

A height of the resonant cavity may be between about 0.5 μm to about 1.5 μm.

The absorption layer may include a first dielectric layer and the nanostructure may be located inside the first dielectric layer.

The nanostructure may include a metal, a metal oxide, or a metal nitride.

A height of the nanostructure may be about 5 nm or more.

A height of the nanostructure may be between about 10 nm to about 60 nm for light in a wavelength range of about 8 μm to about 14 μm.

The nanostructure may include a plurality of nano-disks.

The nanostructure may include a plurality of nano-rings.

The sensing layer further may include a plurality of upper electrodes above the plurality of temperature sensing cells and connecting the plurality of temperature sensing cells in series, and a plurality of lower electrodes under the plurality of temperature sensing cells and connecting the plurality of temperature sensing cells in series.

The sensing layer may include a second dielectric layer and a resistance circuit may be located inside the second dielectric layer, the resistance circuit including the plurality of temperature sensing cells, the plurality of upper electrodes, and the plurality of lower electrodes.

The infrared sensor may include an anchor that supports the composite layer with respect to the substrate, where the resistance circuit includes a first end unit and a second end unit and wherein the first end unit and the second end unit of the resistance circuit are each connected to the substrate through the anchor by a pair of connection units.

The sensing layer may have a rectangular plane shape and a length of each pair of connection units may be greater than a length of one side of the sensing layer.

The plurality of temperature sensing cells may each include at least one magnetic tunneling junction (MTJ) element.

The plurality of temperature sensing cells may each include amorphous silicon.

The absorption layer may be on at least one of lower sides of the sensing layer and upper sides of the sensing layer.

The sensing layer may be between a pair of absorption layers.

According to an aspect of the disclosure, a thermal image sensor may include a sensor array including a plurality of light sensing elements, each of the plurality of light sensing elements including an infrared ray sensor, and a processor configured to read a photoelectricity signal generated in each of the plurality of light sensing elements, where the infrared ray sensor may include a substrate, a reflective layer on an upper surface of the substrate, and a composite layer including an absorption layer including a nanostructure and configured to absorb light energy and a sensing layer including a plurality of temperature sensing cells, where the composite layer may be above the upper surface of the substrate, and where the infrared ray sensor may include a resonant cavity between the composite layer and the reflective layer.

According to an aspect of the disclosure, an electronic apparatus may include a lens assembly configured to form an optical image by focusing light radiated from an object, and a thermal image sensor configured to convert the optical image formed in the lens assembly into an electrical signal, where the thermal image sensor may include a sensor array including a plurality of light sensing elements, each of the plurality of light sensing elements including an infrared ray sensor, and a processor configured to read a photoelectricity signal generated in each of the plurality of light sensing elements, where the infrared ray sensor may include a substrate, a reflective layer on an upper surface of the substrate, and a composite layer including an absorption layer including a nanostructure and configured to absorb light energy and a sensing layer including a plurality of temperature sensing cells, where the composite layer may be above the upper surface of the substrate and where the infrared ray sensor may include a resonant cavity between the composite layer and the reflective layer.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7 is a diagram of a result of simulation of light energy absorption rate according to a thickness of a nano-disk in an infrared ray sensor according to an embodiment shown in FIG. 1A;

FIG. 9 is a diagram of a result of simulation of light energy absorption rate according to a thickness of a nano-ring in an infrared ray sensor according to an embodiment shown in FIG. 1A;

DETAILED DESCRIPTION

Figure 1A:
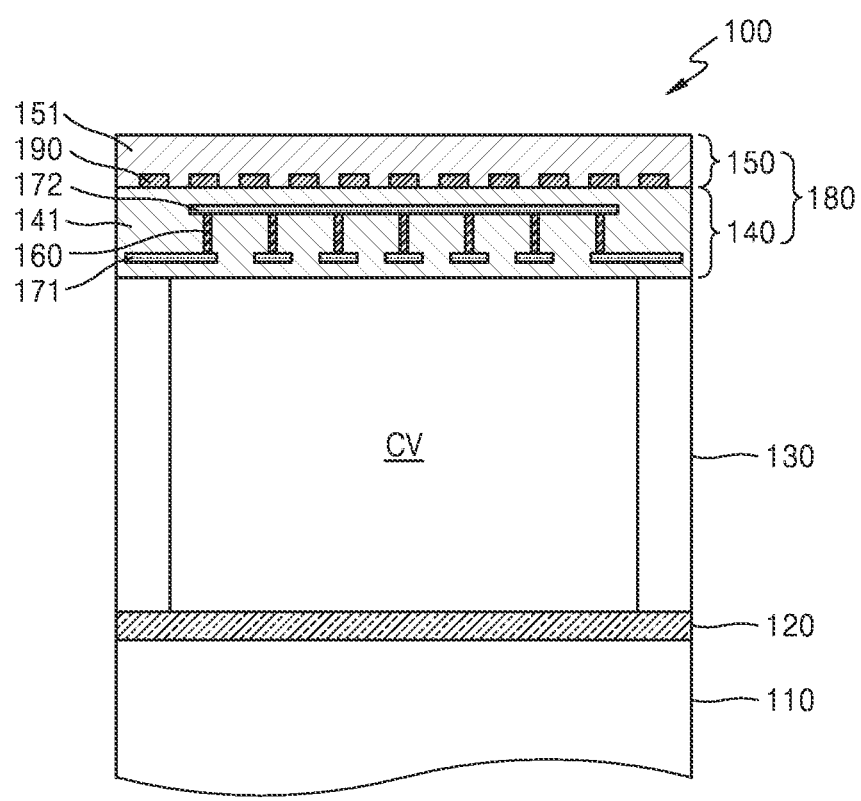
FIG. 1A is a cross-sectional view of an infrared ray sensor according to an embodiment.
Figure 1A:
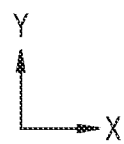

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, a thermal image sensor and an electronic apparatus including the same will be described in detail with reference to the accompanying drawings. In the drawings, like reference numerals refer to like elements throughout, and sizes of elements in the drawings may be exaggerated for clarity and convenience of explanation. In addition, the embodiments of the disclosure are capable of various modifications and may be embodied in many different forms.

Hereinafter, when an element or layer is referred to as being "on" or "above" another element or layer, the element or layer may be directly on another element or layer or intervening elements or layers. The singular forms are intended to include the plural forms as well unless the context clearly indicates otherwise. When a part "comprises" or "includes" an element in the specification, unless otherwise defined, other elements are not excluded from the part and the part may further include other elements.

The term "above" and similar directional terms may be applied to both singular and plural. With respect to operations that constitute a method, the operations may be performed in any appropriate sequence unless the sequence of operations is clearly described or unless the context clearly indicates otherwise. The operations may not necessarily be performed in the order of sequence.

Connections or connection members of lines between components shown in the drawings illustrate functional connections and/or physical or circuit connections, and the connections or connection members may be represented by replaceable or additional various functional connections, physical connections, or circuit connections in an actual apparatus.

All examples or example terms are simply used to explain in detail the technical scope of the disclosure, and thus, the scope of the disclosure is not limited by the examples or the example terms as long as it is not defined by the claims.

Figure 1B:
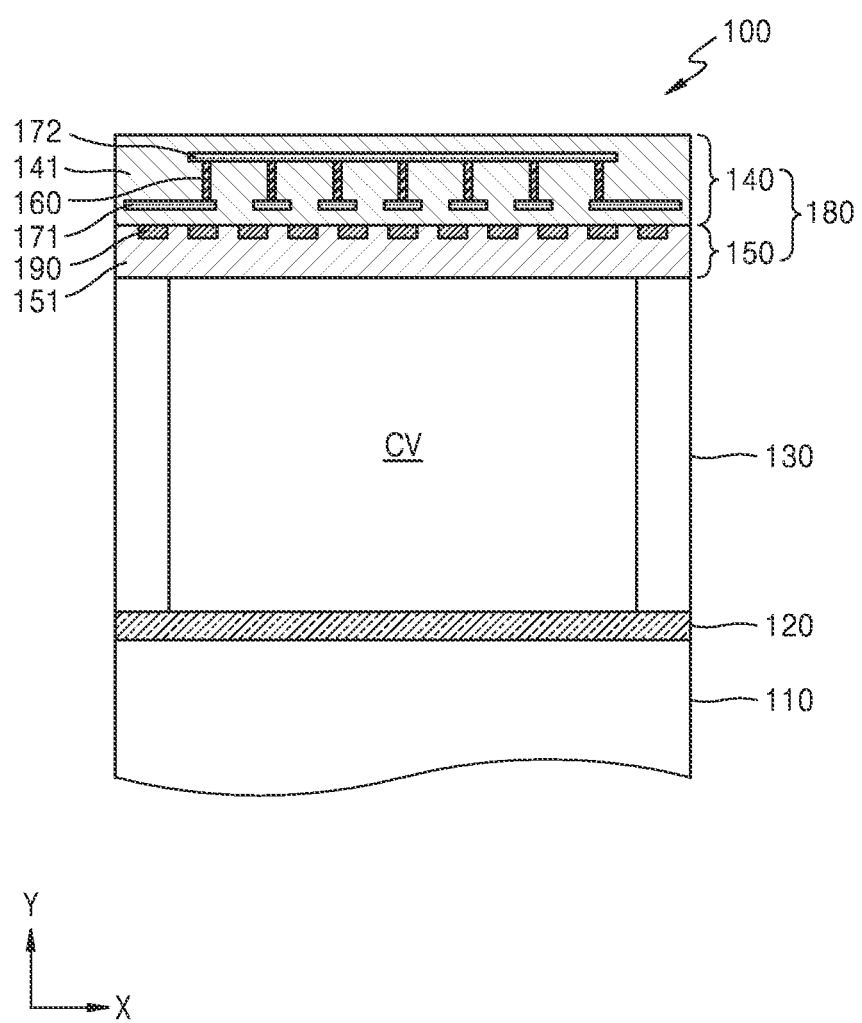
FIG. 1B is a cross-sectional view of an infrared ray sensor according to an embodiment.
Figure 1C:
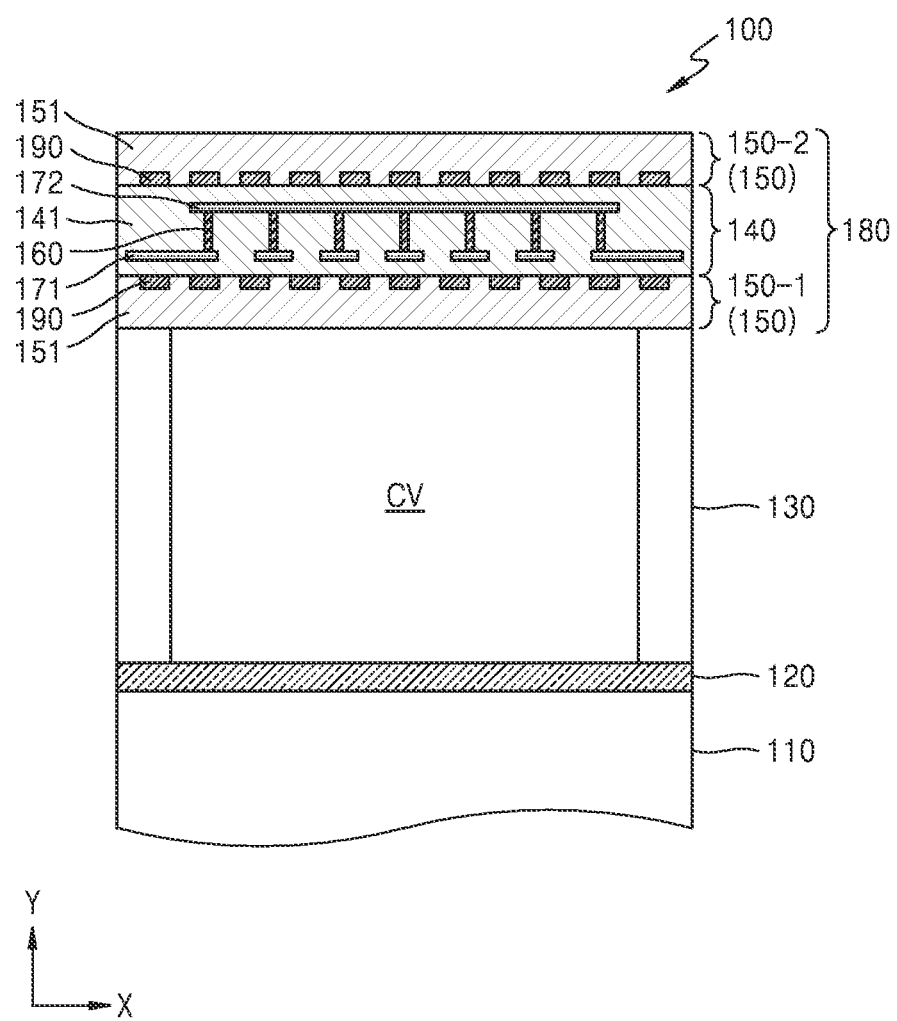
FIG. 1C is a cross-sectional view of an infrared ray sensor according to an embodiment.
Figure 2:
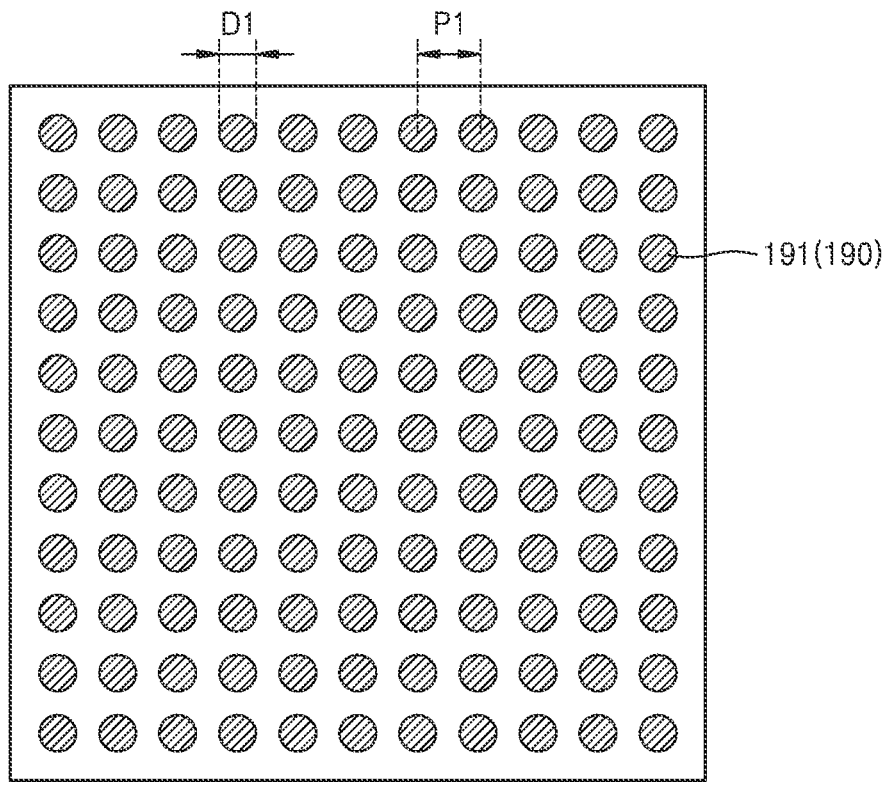
FIG. 2 is a plan view of an example of a nanostructure according to an embodiment.

FIGS. 1A, 1B, and 1C are cross-sectional views of an infrared ray sensor 100 according to embodiments. FIG. 2 is a plan view of an example of a nanostructure 190 according to an embodiment.

Referring to FIGS. 1A, 1B, and 1C, the infrared ray sensor 100 has a microbolometer structure. The infrared ray sensor 100 includes a substrate 110 and a composite layer 180. The composite layer 180 senses a temperature of an object by absorbing light energy radiated from the object. The composite layer 180 includes an absorption layer 150 including a nanostructure 190 and absorbs light energy, as well as a sensing layer 140 including a plurality of temperature sensing cells 160. The absorption layer 150 and the sensing layer 140 are stacked along the Y-axis as indicated in FIGS. 1A-1C (e.g., a thickness direction). The absorption layer 150 may be disposed on at least one of an upper side and a lower side of the sensing layer 140. A reflective layer 120 is provided on a surface of the substrate 110. The composite layer 180 is disposed on the substrate 110 with a resonant cavity CV between the composite layer 180 and the reflective layer 120. For example, an anchor 130 is interposed between the substrate 110 and the composite layer 180 to support the composite layer 180 with respect to the substrate 110. Accordingly, the resonant cavity CV is formed between the reflective layer 120 and the composite layer 180.

As an example, in FIG. 1A, the absorption layer 150 is disposed on the sensing layer 140. The substrate 110 and the sensing layer 140 are separated from each other along the Y-axis as indicated in FIG. 1A (e.g., a thickness direction). The anchor 130 is interposed between the substrate 110 and the sensing layer 140 and supports the sensing layer 140 with respect to the substrate 110. The reflective layer 120 is formed on the surface of the substrate 110. Accordingly, a resonant cavity CV is formed between the substrate 110 and the sensing layer 140.

As an example, in FIG. 1B, the absorption layer 150 is disposed below the sensing layer 140. The substrate 110 and the absorption layer 150 are separated from each other along the Y-axis as indicated in FIG. 1B (e.g., a thickness direction). The anchor 130 is interposed between the substrate 110 and the absorption layer 150, and supports the absorption layer 150 with respect to the substrate 110. The reflective layer 120 is formed on the surface of the substrate 110. Accordingly, a resonant cavity CV is formed between the substrate 110 and the absorption layer 150.

As an example, in FIG. 1C, a pair of absorption layers 150-1 and 150-2 are respectively disposed above and below the sensing layer 140. In other words, the sensing layer 140 is disposed between the pair of absorption layers 150-1 and 150-2. Accordingly, the composite layer 180 has a form in which the absorption layer 150-1, the sensing layer 140, and the absorption layer 150-2 are sequentially stacked. The substrate 110 and the lower absorption layer 150-1 are separated from each other along the Y-axis as indicated in FIG. 1C (e.g., a thickness direction). The anchor 130 is interposed between the substrate 110 and the lower absorption layer 150-1, and supports the absorption layer 150-1 with respect to the substrate 110. The reflective layer 120 is formed on the surface of the substrate 110. Accordingly, a resonant cavity CV is formed between the substrate 110 and the absorption layer 150-1 below.

The substrate 110 may be a semiconductor substrate. For example, the substrate 110 may include silicon (Si), germanium (Ge), or silicon germanium (SiGe). Electronic apparatuses and wires may be provided on the substrate 110. A readout integrated circuit (ROIC) for controlling the infrared ray sensor 100 may be provided on the substrate 110. A timing controller, a row decoder, and an output circuit, which are described below, may be provided on the substrate 110. The electronic apparatuses and wires may apply a reset signal or a read-out signal to magnetoresistive elements described below, and transmit an output signal generated from the magnetoresistive elements to an output circuit.

The reflective layer 120 is provided on the surface of the substrate 110 (i.e., on the surface of the substrate 110 facing the sensing layer 140). The reflective layer 120 raises light absorption rate of the absorption layer 150 by reflecting light (e.g., infrared rays) that have passed through the absorption layer 150 and incident back to the absorption layer 150. The reflective layer 120 may include a metal. For example, the reflective layer 120 may include at least one of titanium nitride (TiN), platinum (Pt), palladium (Pd), tungsten (W), titanium (Ti), aluminum (Al), nickel (Ni), molybdenum (Mo), copper (Cu), and gold (Au).

The absorption layer 150 absorbs incident light (e.g., light emitted from an object, such as infrared ray light energy). The absorption layer 150 includes the nanostructure 190. The nanostructure 190 may refer to a microstructure in which at least one of a shape factor is less than a wavelength of incident light. The nanostructure 190 may include a metal, metal oxide, metal nitride, or the like. For example, the nanostructure 190 may include Ti, Al, TiO$_2$, TiN, Au, or Ag. The nanostructure 190 may have various shapes or patterns capable of absorbing infrared rays in a wavelength range of 8 to 14 μm, based on principles, such as a multi-resonance, a waveguide mode, and a plasmon effect. A thickness of the nanostructure 190 may be, for example, 5 nm or more.

As an example, as shown in FIG. 2, the nanostructure 190 may include a plurality of nano-disks 191 arranged two-dimensionally. In FIG. 2, a plurality of nano-disks 191 are arranged 11×11 in a unit pixel having a size of 10 μm×10 μm. A pitch P1 of the plurality of nano-disks 191 is 1 μm. A diameter D1 of the plurality of nano-disks 191, respectively, may be in a range from 0.2 μm to 1 μm. A thickness of the plurality of nano-disks 191 may be in a range of 10 nm to 60 nm. The plurality of nano-disks 191 may include, for example, TiNx.

For example, the absorption layer 150 may include a first dielectric layer 151. The first dielectric layer 151 may include, for example, SiO$_2$, SiNx, Si, or Ge. In the embodiment, the first dielectric layer 151 includes Si$_3$N$_4$. As shown in FIG. 1A, the nanostructure 190 is formed on a second dielectric layer 141 to be described below, and the first dielectric layer 151 may cover the nanostructure 190. The first dielectric layer 151 may fill a space between the plurality of nano-disks 191. The nanostructure 190 may be contained within (e.g., buried) the first dielectric layer 151. As shown in FIG. 1B, the nanostructure 190 is partially exposed on an upper surface of the first dielectric layer 151, and the second dielectric layer 141 to be described below may be formed thereon to cover the nanostructure 190. The structure shown in FIG. 1C is a combination of the structure of the composite layer 180 shown in FIG. 1A and the structure of the composite layer 180 shown in FIG. 1B.

Referring to FIG. 1A, the sensing layer 140 is disposed below the absorption layer 150. As described above, the resonant cavity CV is interposed between the sensing layer 140 and the reflective layer 120. Referring to FIG. 1B, the sensing layer 140 is disposed on the absorption layer 150, and the resonant cavity CV is interposed between the absorption layer 150 and the reflective layer 120. Referring to FIG. 1C, the sensing layer 140 is disposed between a pair of absorption layers 150-1 and 150-2, and a resonant cavity CV is formed between the absorption layer 150-1 and the reflective layer 120. A height of the resonant cavity CV may be less than ¼ of a wavelength of incident light. For example, the height of the resonant cavity CV may be less than 2 μm for infrared rays in a wavelength band range of 8 μm to 14 μm. As an example, the height of the resonant cavity CV may be in a range of about 0.5 μm to about 1.5 μm for infrared rays in a wavelength band range of about 8 μm to about 14 μm.

The sensing layer 140 includes a plurality of temperature sensing cells 160. The temperature sensing cell 160 may include, for example, a magnetoresistive element or amorphous silicon (a-Si). In the embodiment, a magnetoresistive element is used as the temperature sensing cell 160. The magnetoresistive element includes first and second magnetic layers facing each other with a tunneling barrier layer therebetween. This type of magnetoresistive element is referred to as a magnetic tunneling junction (MTJ) element. The first and second magnetic layers and the tunneling barrier layer are arranged along the Y-axis as indicated in FIG. 1A (e.g., a thickness direction) of the sensing layer 140. The first magnetic layer may be a pinned layer having a fixed magnetization direction, and the second magnetic layer may be a free layer having a magnetization direction that changes with temperature. The number of electrons passing through the tunneling barrier layer changes according to a temperature of the MTJ element, and thus the resistance of magnetic tunneling element changes according to temperature. Therefore, the temperature of an object may be measured by measuring the resistance of the magnetic tunneling element.

The plurality of temperature sensing cells 160 may be electrically connected in series. For example, the sensing layer 140 may include a plurality of upper electrodes 172 and a plurality of lower electrodes 171. The plurality of temperature sensing cells 160 may be electrically connected in series by the plurality of upper electrodes 172 and the plurality of lower electrodes 171. The sensing layer 140 may include a second dielectric layer 141. The plurality of temperature sensing cells 160, the plurality of upper electrodes 172, and the plurality of lower electrodes 171 may be buried in the second dielectric layer 141. For example, the second dielectric layer 141 may include $SiO_2$. A material for forming the second dielectric layer 141 is not limited to $SiO_2$, and may include, for example, SiNx, Si, or Ge.

Figure 3:
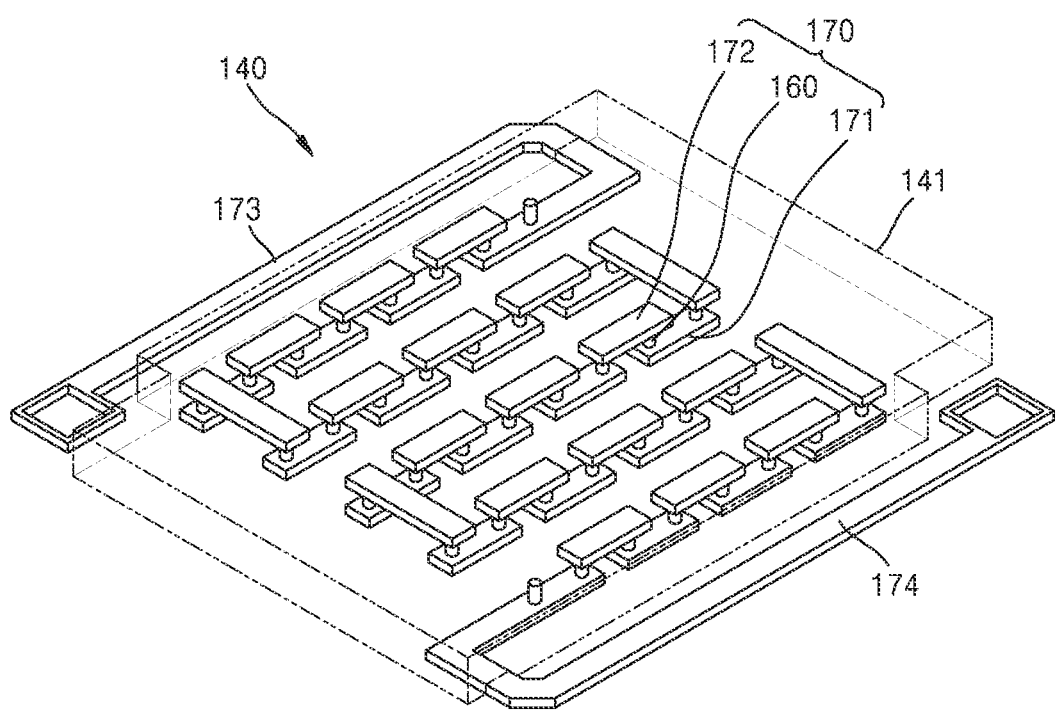
FIG. 3 is a diagram of an example of an electrical connection structure of a plurality of temperature sensing cells according to an embodiment.

FIG. 3 is a diagram of an example of an electrical connection structure of a plurality of temperature sensing cells 160 according to an embodiment. Referring to FIG. 3, the plurality of temperature sensing cells 160, which are arranged in a two-dimensional (2D) 5×8 pattern, are shown. The plurality of upper electrodes 172 are positioned above the plurality of temperature sensing cells 160. The plurality of lower electrodes 171 are positioned under the plurality of temperature sensing cells 160. The plurality of temperature sensing cells 160 are alternately connected by the plurality of upper electrodes 172 and the plurality of lower electrodes 171. For example, the plurality of upper electrodes 172 connect a first magnetic layer of a pair of adjacent temperature sensing cells 160 to each other, and the plurality of lower electrodes 171 may connect one of the pair of temperature sensing cells 160 connected by the plurality of upper electrodes 172 to the second magnetic layer of the other temperature sensing cell 160 adjacent thereto. Accordingly, the plurality of temperature sensing cells 160 are electrically connected in series by the plurality of upper electrodes 172 and the plurality of lower electrodes 171. A resistance circuit 170 formed by the plurality of temperature sensing cells 160, the plurality of upper electrodes 172, and the plurality of lower electrodes 171 is connected to the wires of the substrate 110 through the anchor 130. For example, the resistance circuit 170 may be connected to the substrate 110 through the anchor 130 by the connection units 173 and 174. Because the resistance circuit 170 and the substrate 110 are electrically and thermally connected to each other, heat may leak from the sensing layer 140 to the substrate 110 through the connection units 173 and 174. The amount of heat leakage decreases as the length of a heat transfer path increases. The connection units 173 and 174 may have an appropriate length to reduce heat loss to the substrate 110. As an example, according to the electrical connection structure shown in FIG. 3, the connection units 173 and 174 are greater than one side of the sensing layer 140 having a rectangular planar shape. Accordingly, heat loss may be reduced compared to the case when the resistance circuit 170 is directly connected to the anchor 130.

Figure 4:
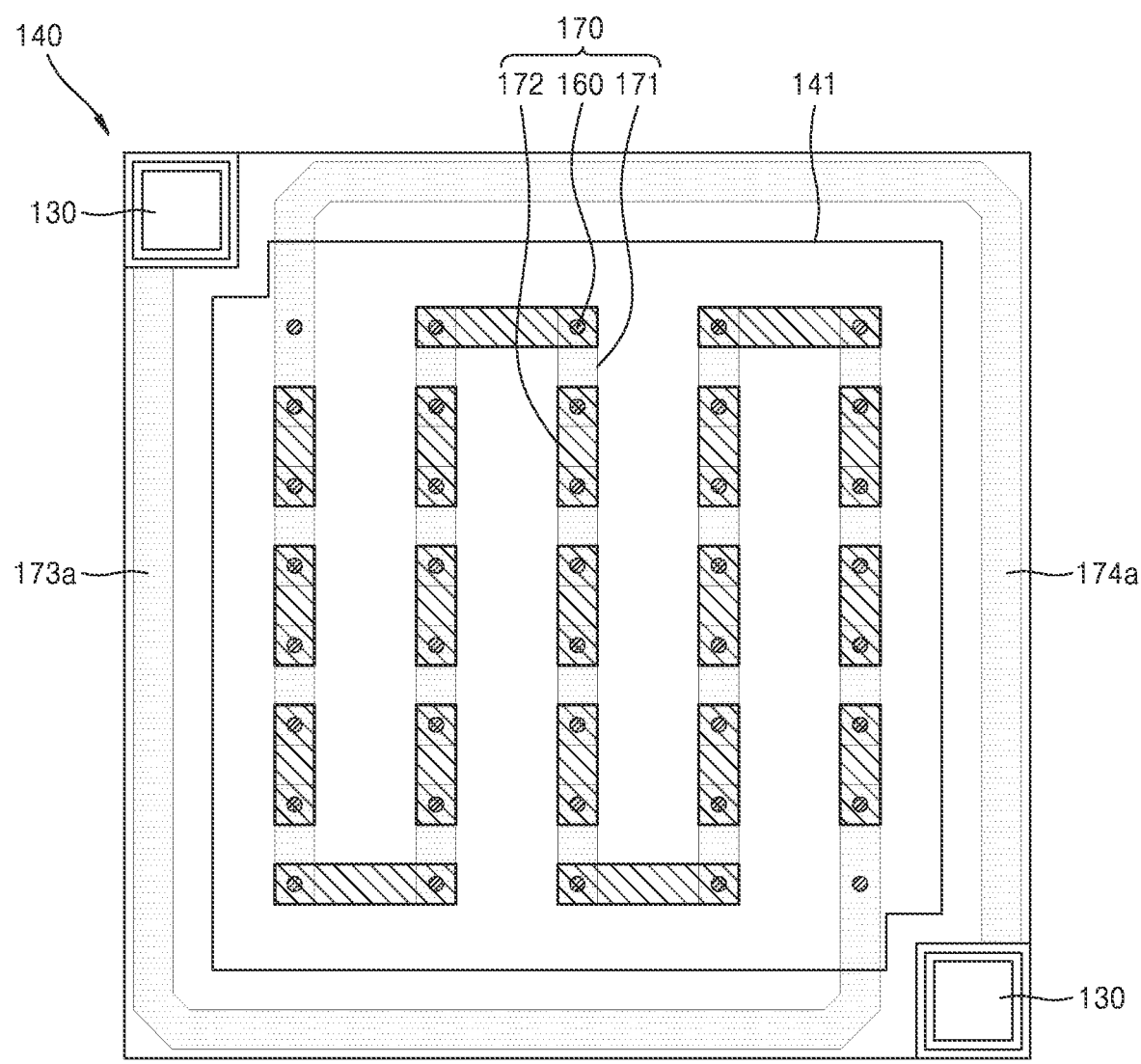
FIG. 4 is a plan view of an example of an electrical connection structure of a plurality of temperature sensing cells according to an embodiment.

FIG. 4 is a plan view of an example of an electrical connection structure of a plurality of temperature sensing cells 160 according to an embodiment. Referring to FIG. 4, the plurality of temperature sensing cells 160, which are arranged in a 2D 5×8 pattern, are shown. The plurality of temperature sensing cells 160 are electrically connected in series by the plurality of upper electrodes 172 and the plurality of lower electrodes 171. The resistance circuit 170 formed by the plurality of temperature sensing cells 160, the plurality of upper electrodes 172, and the plurality of lower electrodes 171 is connected to the substrate 110 through connection units 173a and 174a and the anchor 130. The connection units 173a and 174a have lengths corresponding to lengths of two sides of the sensing layer 140 having a rectangular planar shape. Accordingly, heat loss may be reduced compared to a case when the resistance circuit 170 is directly connected to the anchor 130.

Figure 5:
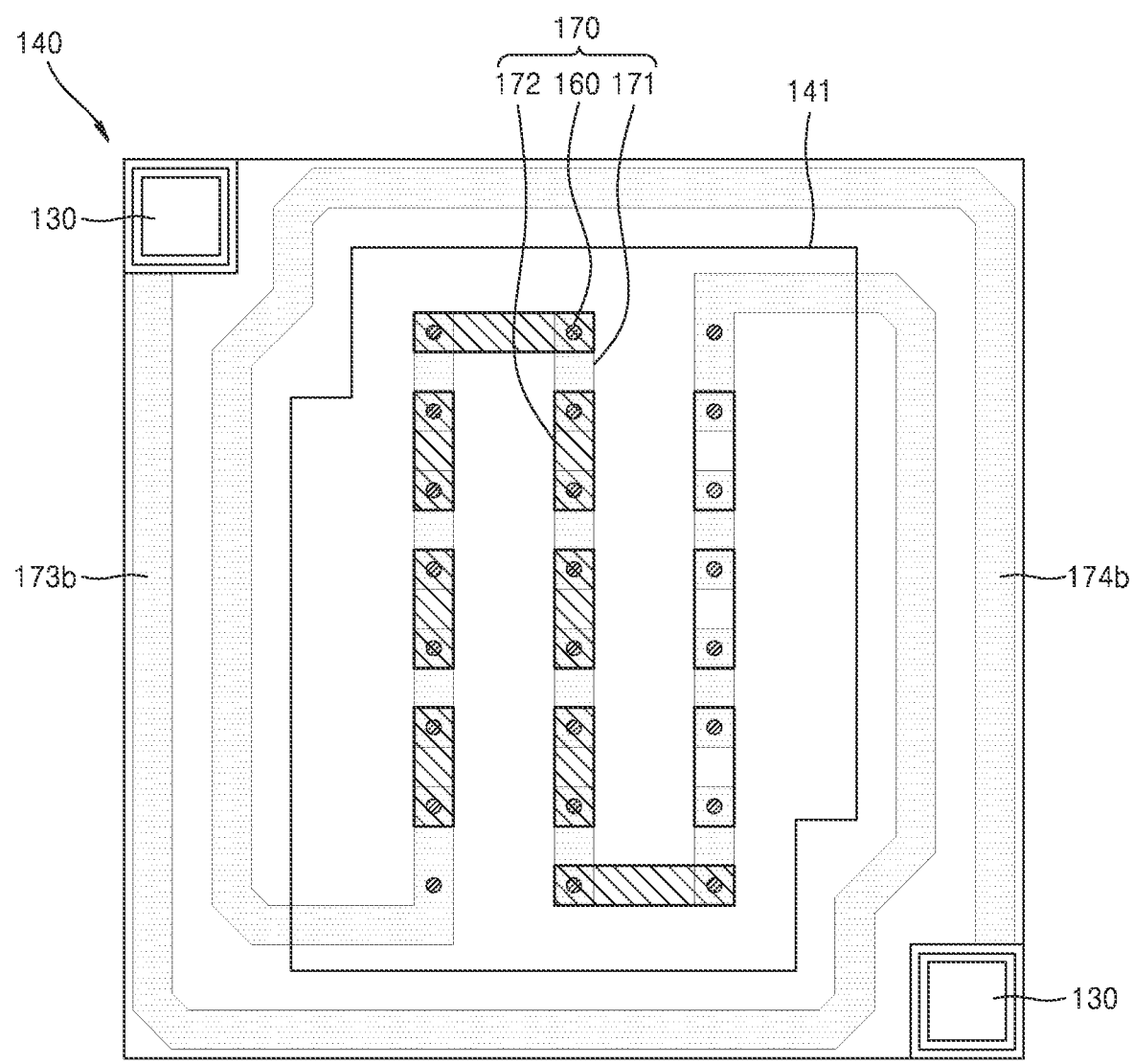
FIG. 5 is a plan view of an example of an electrical connection structure of a plurality of temperature sensing cells according to an embodiment.

FIG. 5 is a plan view of an example of an electrical connection structure of a plurality of temperature sensing cells 160 according to an embodiment. Referring to FIG. 5, the plurality of temperature sensing cells 160, which are arranged in a 2D 3×8 pattern, are shown. The plurality of temperature sensing cells 160 are electrically connected in series by the plurality of upper electrodes 172 and the plurality of lower electrodes 171. The resistance circuit 170 formed by the plurality of temperature sensing cells 160, the plurality of upper electrodes 172, and the plurality of lower electrodes 171 is connected to the substrate 110 through the connection units 173b and 174b and the anchor 130. The connection units 173b and 174b have lengths corresponding to lengths of three sides of the sensing layer 140 having a rectangular planar shape. Accordingly, heat loss may be reduced compared to a case when the resistance circuit 170 is directly connected to the anchor 130.

The number, arrangement, and electrical connection structure of the plurality of temperature sensing cells 160 are not limited to the examples shown in FIGS. 3 to 5, and various combinations that may obtain desired temperature sensing efficiency and reduce heat loss may be possible According to the configuration described above, light radiated from an object, for example, infrared rays, is incident on the infrared ray sensor 100 by a condensing unit (e.g., a condensing lens). Light energy incident on the absorption layer 150 is absorbed to the absorption layer 150 by the nanostructure 190 and converted into thermal energy. Infrared rays passing through the absorption layer 150 are reflected by the reflective layer 120 and re-incident to the absorption layer 150, and are re-absorbed by the absorption layer 150 and converted into thermal energy. Accordingly, the absorption of light energy may be improved. The thermal energy increases the temperature of the sensing layer 140 disposed adjacent to the absorption layer 150 (e.g., contacting the absorption layer 150). The resistance of the plurality of temperature sensing cells 160 changes according to the temperature of the sensing layer 140. A temperature of an object may be measured by measuring the resistance of the resistance circuit 170 formed by the plurality of upper electrodes 172, the plurality of lower electrodes 171, and the plurality of temperature sensing cells 160.

In the case of a conventional infrared ray sensor using an absorption layer including a metal thin film, in order to optimize the absorbance of an absorption layer, the thickness of the metal thin film should be very small in the order of several nanometers. The uniformity of the thickness of the metal thin film affects the temperature sensing performance of the infrared ray sensor. However, there may be difficult uniformly depositing a metal thin film having a thickness of several nanometers on an 8-inch or 12-inch wafer, which may result in reduced process yield and increased manufacturing cost of the infrared ray sensor.

In the infrared ray sensor 100 according to the disclosure, the nanostructure 190 is employed in the absorption layer 150. The nanostructure 190 has a thickness of about 5 nm or more. The difficulty of a process for forming a relatively thick nanostructure 190 is relatively low compared to that of a process of uniformly forming a thin metal thin film of several nanometers. Accordingly, the absorption layer 150 may be formed by using an easier process, and thus, a process yield of the infrared ray sensor 100 may be improved.

On the other hand, in the case of an infrared ray sensor employing an absorption layer including a metal thin film, the absorption heat of light energy is optimized at the thickness of the resonant cavity of about ¼ of a wavelength of incident light. For example, the thickness of the resonant cavity is about 2.5 µm for long-wavelength infrared light having a wavelength of about 10 µm. The resonant cavity may be formed by forming a sacrificial layer (e.g., an amorphous carbon layer (ACL) on a substrate), sequentially forming a sensing layer and an absorption layer, and removing the sacrificial layer. In view of the nano process, the sacrificial layer has a thickness of about 2.5 µm, which is very large, and it may be difficult to perform a thin film process for forming a sensing layer and an absorption layer on such a thick sacrificial layer.

According to the infrared ray sensor 100 employing the nanostructure 190, according to the disclosure, the height of the resonant cavity CV is less than ¼ of a wavelength of incident light. For example, for infrared rays in a wavelength band range of about 8 µm to about 14 µm, the height of the resonant cavity CV may be less than about 2.0 µm. According to simulation results described below, the infrared ray sensor 100 having a sufficient light energy absorptance for infrared rays in a wavelength band range of about 8 µm to about 14 µm may be implemented even when a resonant cavity CV having a thickness in a range of about 0.5 to about 1.5 µm is applied. Therefore, in a manufacturing process of the infrared ray sensor 100, the thickness of the sacrificial layer may be reduced, and thus, the difficulty of the process may be reduced, and a process time may be reduced.

Figure 6:
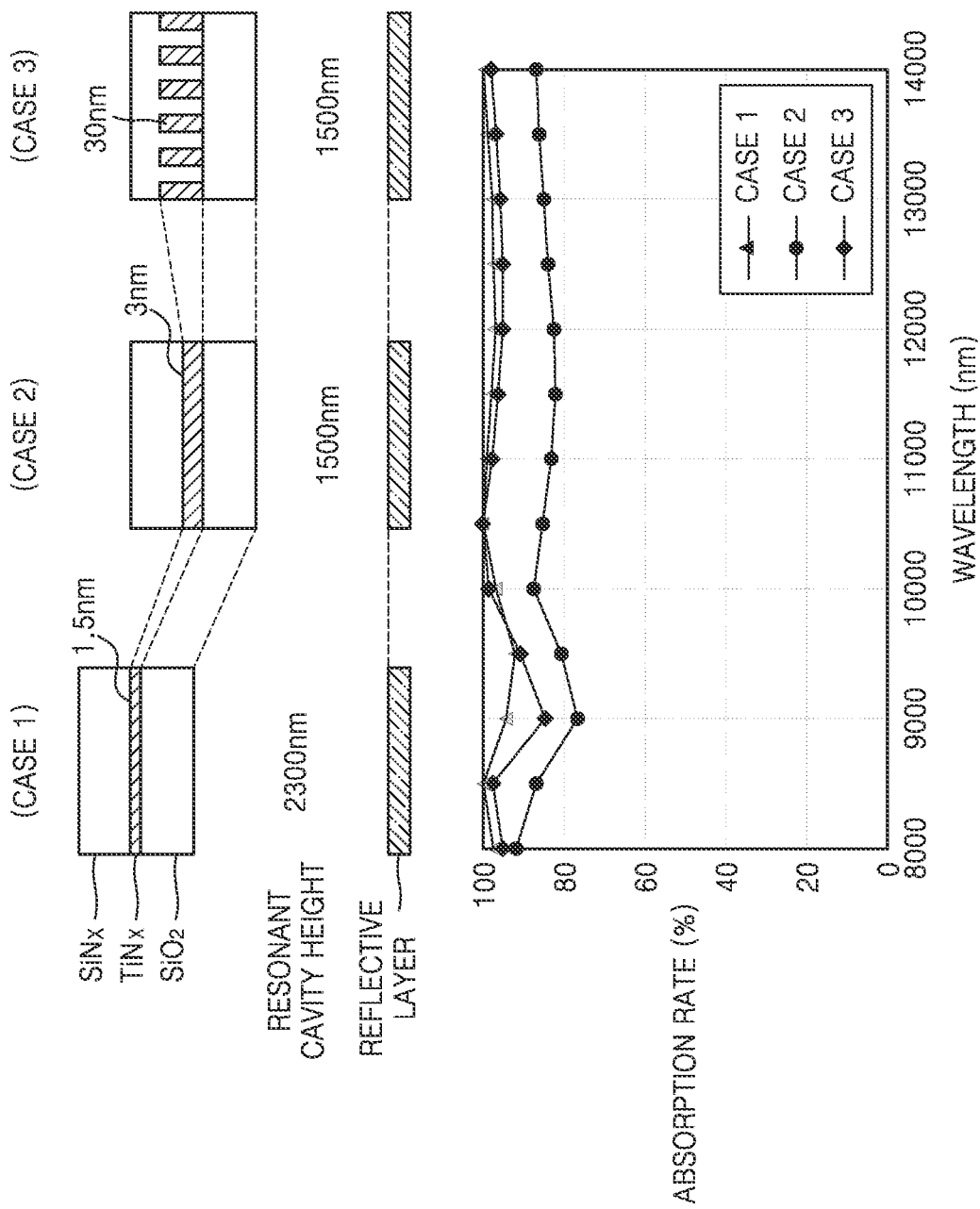
FIG. 6 is a diagram of a result of simulation of light energy absorption rate of an infrared ray sensor according to an embodiment shown in FIG. 1A.

FIG. 6 is a diagram of a result of simulation of light energy absorption rate of the infrared ray sensor 100 according to an embodiment shown in FIG. 1A. Common simulation conditions are as follows.

First dielectric layer 151: SiNx, thickness 130 nm;
Second dielectric layer 141: SiO$_2$, thickness 150 nm;
Reflective layer 120: Al, thickness 100 nm; and
Unit pixel size: 10 µm×10 µm.

As a comparative example, Case 1 is a case when a TiNx thin film having a thickness of 1.5 nm is applied instead of the nanostructure 190 and a height of the resonant cavity is set to 2.3 µm. As a comparative example, Case 2 is a case when a TiNx thin film having a thickness of 3 nm is applied instead of the nanostructure 190 and a height of the resonant cavity is set to 1.5 µm. According to embodiments of the disclosure, Case 3 is a case in which a TiNx-nano-disk 191 having a thickness of 30 nm and a diameter of 600 nm is applied as the nanostructure 190 and a height of the resonant cavity is set to 1.5 µm. For each case, FIG. 6 shows the result of simulation of light energy absorption rate for normally incident light having a wavelength in a range of 8 µm to 14 µm.

Referring to FIG. 6, with respect to normally incident light having a wavelength in a range of 8 µm to 14 µm, an average light energy absorption rate of Case 1, Case 2, and Case 3 was 97%, 84%, and 95%, respectively. As it may be seen from the results of Case 1 and Case 2, even if the thickness of the metal thin film is slightly increased from 1.5 nm to 3 nm, the average light energy absorption rate is very significantly reduced from 97% to 84%. In addition, it may be seen that the height of the resonant cavity greatly affects the light energy absorption rate. That is, in the case of a conventional absorption layer including a metal thin film, a very thin metal thin film is required, and the light energy absorption rate is greatly affected by the thickness of the metal thin film. This means that the height of the resonant cavity also needs to be ¼ of a wavelength of incident light. These may result in an increase in process difficulty and process cost. On the other hand, as shown in Case 3, because the difficulty of the manufacturing process may be lowered by employing the nano-disk 191 having a thickness of 30 nm and a height of a resonant cavity of 1.5 µm, it is possible to obtain a light energy absorption rate almost equivalent to CASE 1 while increasing manufacturing yield and reducing manufacturing cost.

FIG. 7 is a diagram of a result of simulation of light energy absorption rate according to a thickness of the nano-disk 191 in the infrared ray sensor 100 according to an embodiment shown in FIG. 1A. The simulation conditions are as follows.

First dielectric layer 151: SiNx, thickness 130 nm;
Second dielectric layer 141: SiO$_2$, thickness 150 nm;
Reflective layer 120: Al, thickness 100 nm;
Height of Resonant cavity CV: 1.5 µm;
Size of Unit pixel: 10 µm×10 µm; and
Nano-disk 191: TiNx, thickness 10-60 nm, diameter 600 nm, pitch 1 µm.

Referring to FIG. 7, even when the height of the resonant cavity CV is 1.5 µm, an average light energy absorption rate of 90% or more is obtained for normally incident light having a wavelength in a range of about 8 µm to about 14 µm in the thickness range of about 10 nm to about 60 nm of the nano-disk 191. That is, in the case of the infrared ray sensor 100 according to an embodiment, even if the nano-disk 191 pattern having a thickness several tens of times greater is applied compared to the metal thin film applied to the absorption layer of the infrared ray sensor of the related art, a light energy absorption rate of more than 90% may be obtained at a relatively small height of the resonant cavity CV. In addition, an average light energy absorption rate of about 91 to 92% is shown over a thickness range of 10 to 60 nm of the nano-disk 191, and the average light energy absorption rate is relatively insensitive to the thickness of the nano-disk 191. That is, because the light energy absorption rate is relatively less affected by the uniformity of the thickness of the nano-disk 191, the process difficulty is low, and thus, the infrared ray sensor 100 may be manufactured with a high yield.

Figure 8:
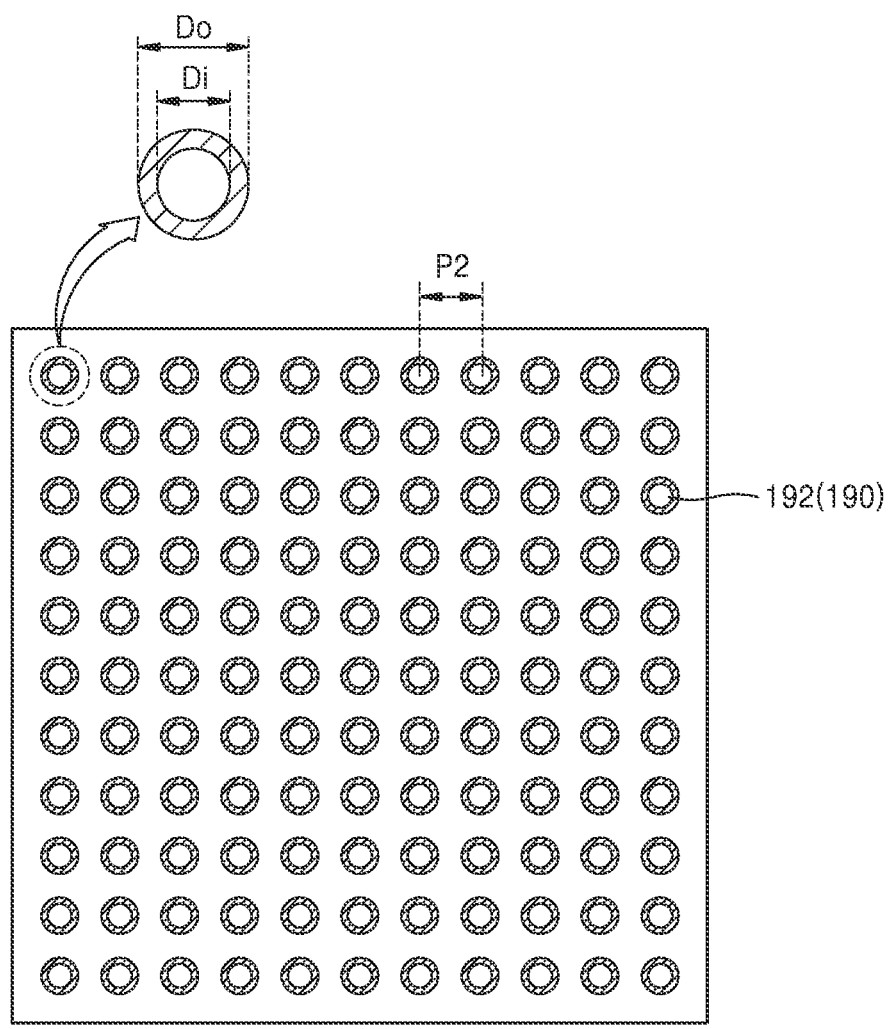
FIG. 8 is a plan view of an example of a nanostructure according to an embodiment.

FIG. 8 is a plan view of an example of a nanostructure according to an embodiment. The nanostructure 190 is not limited to the nano-disk 191 shown in FIG. 2. The nanostructure 190 may be implemented in various forms. FIG. 8 is a schematic plan view of a nanostructure 190. Referring to FIG. 8, the nanostructure 190 may include a nano-ring 192. A plurality of nano-rings 192 may be 2D arranged within a unit pixel of the infrared ray sensor 100. An inner diameter (Di), outer diameter (Do), pitch (P2), thickness, etc., of the nano-ring 192 may be determined to obtain, for example, a light energy absorption rate of 90% or more for incident light, for example, in a wavelength range of 8 µm to 14 µm.

FIG. 9 is a diagram of a result of simulation of light energy absorption rate according to a thickness of the nano-ring 192 in the infrared ray sensor 100 according to an embodiment shown in FIG. 1A. The simulation conditions are as follows:

First dielectric layer 151: SiNx, thickness 130 nm;
Second dielectric layer 141: SiO$_2$, thickness 150 nm;
Reflective layer 120: Al, thickness 100 nm;
Height of Resonant cavity CV: 1.5 µm;
Unit pixel size: 10 µm×10 µm; and Nano-ring 192: TiNx, thickness 10-60 nm, outer diameter 800 nm, inner diameter 600 nm, pitch 1 μm.

Referring to FIG. 9, even when the height of the resonant cavity CV is 1.5 μm, the average light energy absorption rate of 90% or more for normally incident light having a wavelength of 8 to 14 μm over the thickness range of 10 to 60 nm of the nano ring 192. In the case of the infrared ray sensor 100 according to an embodiment, even if a nano-ring 192 pattern having a thickness 10 times or greater is applied compared to the metal thin film applied to the absorption layer of the infrared ray sensor of the related art, an absorption rate of more than 90% may be obtained at a relatively small height of the resonant cavity CV. In addition, an average light energy absorption rate of about 90% is shown over a thickness range of 10 nm to 60 nm of the nano-ring 192, and the light energy absorption rate is relatively less affected by the uniformity of the thickness of the nano-ring 192.

Figure 10:
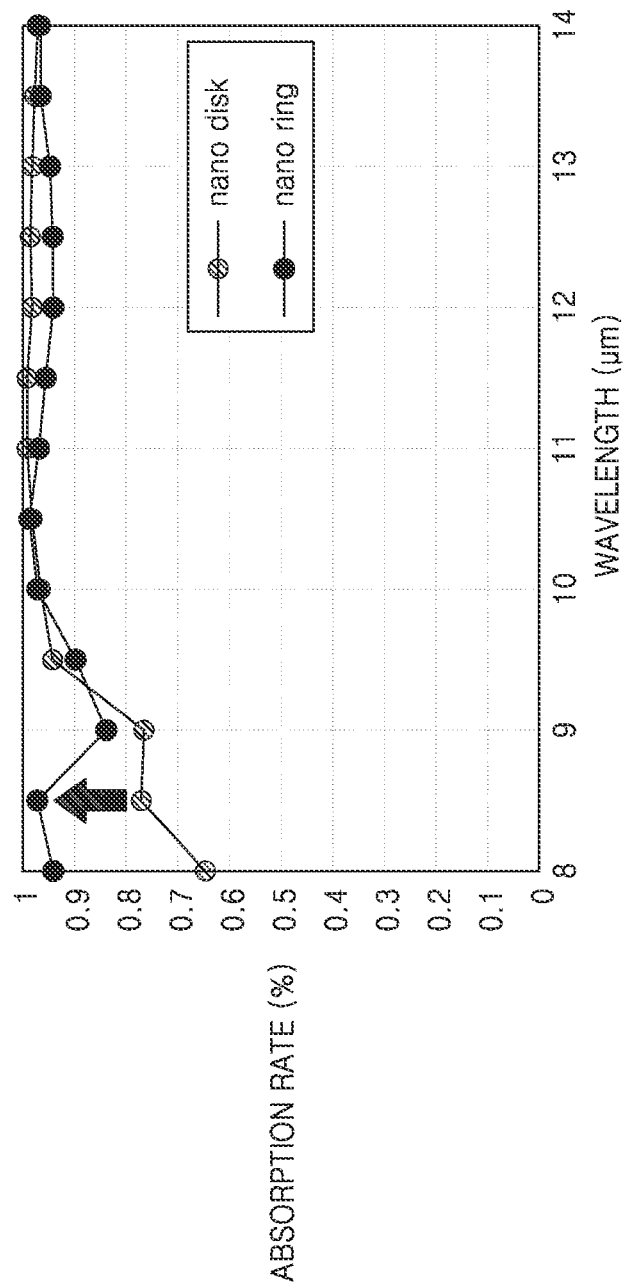
FIG. 10 is a graph of a comparison of simulation results of FIG. 7 and FIG. 9 according to an embodiment.

FIG. 10 is a graph of a comparison of simulation results of FIG. 7 and FIG. 9. In FIG. 10, the thickness of the nano-disk 191 and the nano-ring 192 is 30 nm. Referring to FIG. 10, when the thicknesses of the nano-disk 191 and the nano-ring 192 are the same, it is confirmed that absorption rate for incident light in a wavelength range of 8 nm to 9 μm is improved by applying the nano-ring 192. In this way, by changing inner and outer diameters of the nano-ring 192, the infrared ray sensor 100 having an optimal absorption rate for a desired wavelength band may be implemented.

Figure 11:
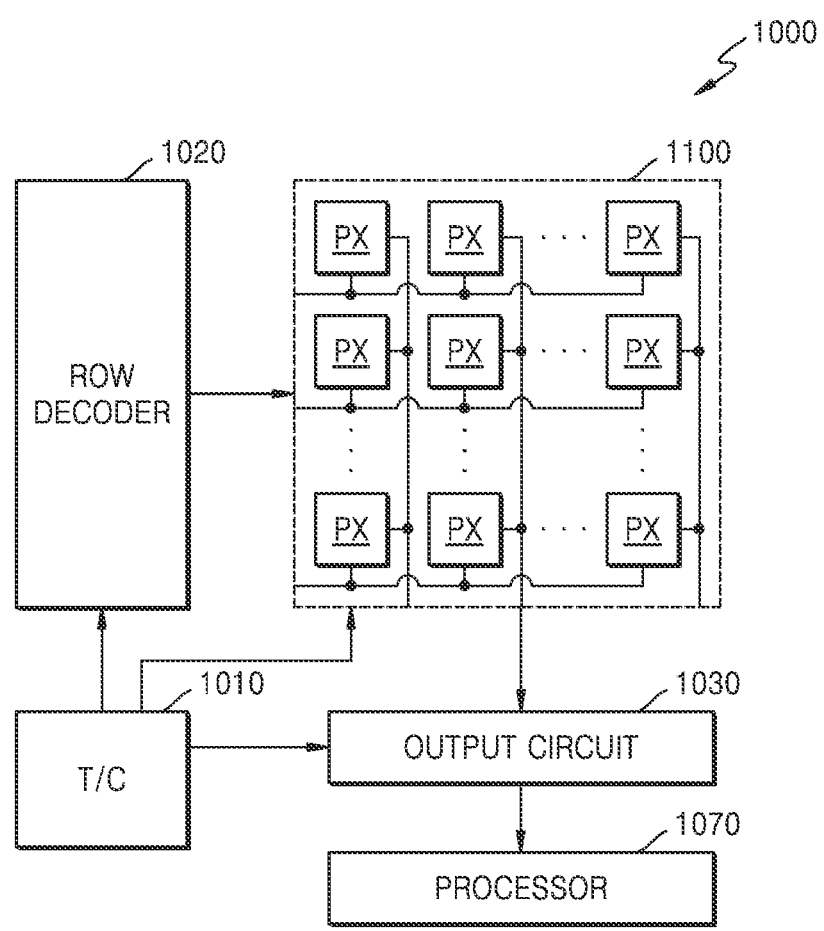
FIG. 11 is a diagram of a thermal image sensor according to an embodiment.

FIG. 11 is a diagram of a thermal image sensor 1000 according to an embodiment. Referring to FIG. 11, the thermal image sensor 1000 includes a pixel array 1100 including a plurality of pixels PX. Each of the plurality of pixels PX includes the infrared ray sensor 100 described above. A band pass filter that transmits light in a predetermined wavelength band, for example, a wavelength band of 8 μm to 14 μm, may be disposed on a light incident side of each of the plurality of pixels PX. The thermal image sensor 1000 may include a pixel array 1100, a timing controller (T/C) 1010, a row decoder 1020, an output circuit 1030, and a processor 1070. The T/C 1010, the row decoder 1020, the output circuit 1030, and the processor 1070 may be implemented as one chip or separate chips.

The pixels PXs of the pixel array 1100 may be two-dimensionally arranged along a plurality of rows and columns. The row decoder 1020 selects one of the rows of the pixel array 1100 in response to a row address signal output from the timing controller 1010. The output circuit 1030 outputs a detection signal in units of columns from the plurality of pixels PXs arranged along the selected row. To this end, the output circuit 1030 may include a column decoder and an analog to digital converter (ADC). For example, the output circuit 1030 may include a plurality of ADCs respectively disposed for each column between the column decoder and the pixel array 1100, or one ADC disposed at an output terminal of the column decoder. The processor 1070 may detect a temperature of an object by processing an electrical signal received from the output circuit 1030 and form an image according to the temperature of the object (e.g., an infrared ray image).

Figure 12:
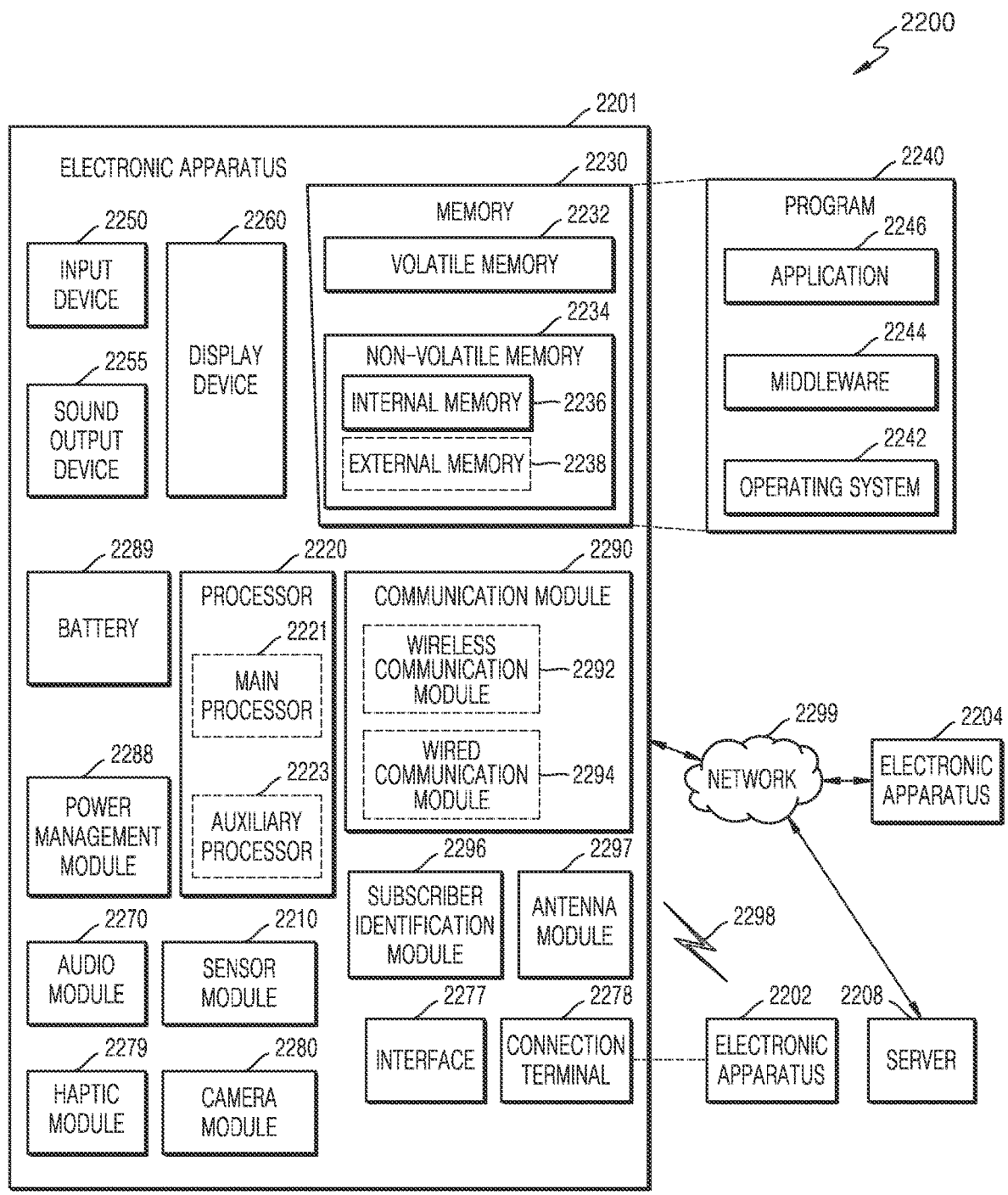
FIG. 12 is a diagram of a schematic structure of an electronic apparatus including a thermal image sensor according to an embodiment.
Figure 13:
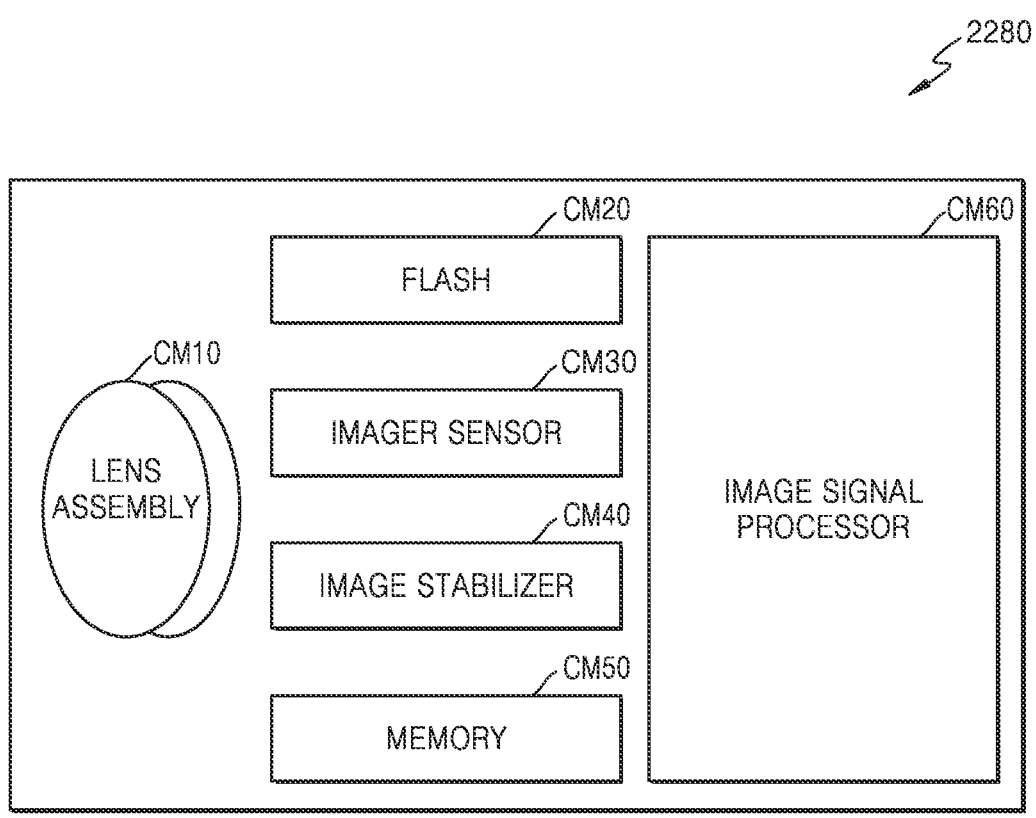
FIG. 13 is a diagram of a schematic structure of a camera module included in the electronic apparatus of FIG. 12 according to an embodiment.

FIG. 12 is a diagram of a schematic structure of an electronic apparatus including a thermal image sensor according to an embodiment. FIG. 13 is a diagram showing a schematic structure of a camera module included in the electronic apparatus of FIG. 12 according to an embodiment.

Referring to FIG. 12, in a network environment 2200, an electronic apparatus 2201 may communicate with another electronic apparatus 2202 through a first network 2298 (a short-range wireless communication network, etc.) or may communicate with another electronic apparatus 2204 and/or a server 2208 through a second network 2299 (a remote wireless communication network). The electronic apparatus 2201 may communicate with the electronic apparatus 2204 through the server 2208. The electronic apparatus 2201 may include a processor 2220, a memory 2230, an input device 2250, an sound output device 2255, a display device 2260, an audio module 2270, a sensor module 2210, an interface 2277, a haptic module 2279, a camera module 2280, a power management module 2288, a battery 2289, a communication module 2290, a subscriber identification module 2296, and/or an antenna module 2297. In the electronic apparatus 2201, some of these components (e.g., the display device 2260) may be omitted or other components may be added. Some of these components may be implemented as one integrated circuit. For example, a fingerprint sensor 2211 of the sensor module 2210, an iris sensor, an illuminance sensor, etc. may be implemented in a form embedded in the display device 2260 (a display, etc.).

The processor 2220 may execute software (such as a program 2240) to control one or a plurality of other components (hardware, software components, etc.) of the electronic apparatus 2201 connected to the processor 2220, and may perform various data processing or operations. As part of data processing or operations, the processor 2220 may load commands and/or data received from other components (the sensor module 2210, the communication module 2290, etc.) into a volatile memory 2232, and may process commands and/or data stored in the volatile memory 2232, and store resulting data in a non-volatile memory 2234. The processor 2220 may include a main processor 2221 (a central processing unit, an application processor, etc.) and an auxiliary processor 2223 (a graphics processing unit, an image signal processor, a sensor hub processor, a communication processor, etc.) that may be operated independently or together with the main processor 2221. The auxiliary processor 2223 may use less power than the main processor 2221 and may perform a specialized function.

The auxiliary processor 2223 may control functions and/or states related to some of the components (e.g., the display device 2260, the sensor module 2210, the communication module 2290) of the electronic apparatus 2201 instead of the main processor 2221 while the main processor 2221 is in an inactive state (sleep state), or together with the main processor 2221 while the main processor 2221 is in an active state (application execution state). The auxiliary processor 2223 (an image signal processor, a communication processor, etc.) may be implemented as a part of other functionally related components (the camera module 2280, the communication module 2290, etc.).

The memory 2230 may store various data required by components of the electronic apparatus 2201 (the processor 2220, the sensor module 2276, etc.). The data may include, for example, input data and/or output data for software (such as the program 2240) and instructions related to the command. The memory 2230 may include a volatile memory 2232 and/or a non-volatile memory 2234.

The program 2240 may be stored as software in the memory 2230, and may include an operating system 2242, middleware 2244, and/or an application 2246.

The input device 2250 may receive commands and/or data to be used in a component (e.g., the processor 2220) of the electronic apparatus 2201 from the outside of the electronic apparatus 2201 (e.g., a user). The input device 2250 may include a microphone, a mouse, a keyboard, and/or a digital pen (such as a stylus pen).

The sound output device 2255 may output a sound signal to the outside of the electronic apparatus 2201. The sound output device 2255 may include a speaker and/or a receiver. The speaker may be used for general purposes, such as multimedia playback or recording playback, and the receiver may be used to receive incoming calls. The receiver may be integrated as a part of the speaker or may be implemented as an independent separate device.

The display device 2260 may visually provide information to the outside of the electronic apparatus 2201. The display device 2260 may include a control circuit for controlling a display, a hologram device, or a projector and a corresponding device. The display device 2260 may include a touch circuitry configured to sense a touch, and/or a sensor circuitry configured to measure the intensity of force generated by the touch (e.g., a pressure sensor, etc.). The display device 2260 may be provided in plurality.

The audio module 2270 may convert a sound into an electric signal or, conversely, convert an electric signal into a sound. The audio module 2270 may obtain a sound through the input device 2250 or may output a sound through a speaker and/or headphone of the sound output device 2255 and/or another electronic apparatus (e.g., the electronic apparatus 2202) directly or wirelessly connected to electronic apparatus 2201.

The sensor module 2210 may detect an operating state (power, temperature, etc.) of the electronic apparatus 2201 or an external environmental state (user state, etc.), and may generate an electrical signal and/or data value corresponding to the sensed state. The sensor module 2210 may include a fingerprint sensor, an acceleration sensor, a position sensor, a three-dimensional (3D) sensor, and the like, and in addition to the above sensors, may include an iris sensor, a gyro sensor, a barometric pressure sensor, a magnetic sensor, a grip sensor, a proximity sensor, a color sensor, an infrared (IR) sensor, a biometric sensor, a temperature sensor, a humidity sensor, and/or an illuminance sensor.

The interface 2277 may support at least one designated protocol that may be used by the electronic apparatus 2201 to connect directly or wirelessly with another electronic apparatus (e.g., the electronic apparatus 2202). The interface 2277 may include a High-Definition Multimedia Interface (HDMI), a Universal Serial Bus (USB) interface, a secure digital (SD) card interface, and/or an audio interface.

The connection terminal 2278 may include a connector through which the electronic apparatus 2201 may be physically connected to another electronic apparatus (e.g., the electronic apparatus 2202). The connection terminal 2278 may include an HDMI connector, a USB connector, an SD card connector, and/or an audio connector (e.g., a headphone connector).

The haptic module 2279 may convert an electrical signal into a mechanical stimulus (vibration, movement, etc.) or an electrical stimulus that the user may perceive through tactile or kinesthetic sense. The haptic module 2279 may include a motor, a piezoelectric element, and/or an electrical stimulation device.

The camera module 2280 may capture still images and moving images. The camera module 2280 may include a lens assembly including one or more lenses, image sensors, image signal processors, and/or flashes. The image sensor of the camera module 2280 may have the thermal image sensor 1000 described above or a structure modified therefrom, and the pixels of the thermal image sensor 1000 may include the infrared ray sensor 100 described above. The thermal image sensor 1000 may operate, for example, in a wavelength band range of about 8 µm to about 14 µm. A plurality of camera modules 2280 operating in various wavelength bands may be provided.

The application 2246 may include one or more applications executed in association with the display device 2260. The application may display additional information suitable for a user environment on the display device 2260. For example, the camera module 2280 may be used as a sensor for recognizing the user environment, and necessary additional information may be displayed on the display device 2260 according to the recognized result.

The power management module 2288 may manage power supplied to the electronic apparatus 2201. The power management module 2288 may be implemented as part of a Power Management Integrated Circuit (PMIC).

The battery 2289 may supply power to components of the electronic apparatus 2201. The battery 2289 may include a non-rechargeable primary cell, a rechargeable secondary cell, and/or a fuel cell.

The communication module 2290 may establish a direct (wired) communication channel and/or wireless communication channel between the electronic apparatus 2201 and other electronic apparatuses (the electronic apparatus 2202, an electronic apparatus 2204, server 2208, etc.) and may support a communication performance through an established communication channel. The communication module 2290 may include one or more communication processors that operate independently of the processor 2220 (e.g., an application processor) and support direct communication and/or wireless communication. The communication module 2290 may include a wireless communication module 2292 (a cellular communication module, a short-range wireless communication module, a Global Navigation Satellite System (GNSS) communication module) and/or a wired communication module 2294 (a Local Area Network (LAN) communication module, or a power line communication module, etc.). Among these communication modules, a corresponding communication module may communicate with other electronic apparatuses through the first network 2298 (a short-range communication network, such as Bluetooth, WiFi Direct, or Infrared Data Association (IrDA)) or the second network 2299 (a telecommunication network, such as a cellular network, the Internet, or a computer network (e.g., LAN and wide area network (WAN), etc.). The various types of communication modules may be integrated into one component (a single chip, etc.) or implemented as a plurality of components (plural chips) separate from each other. The wireless communication module 2292 may identify and authenticate the electronic apparatus 2201 within a communication network, such as the first network 2298 and/or the second network 2299 by using subscriber information (such as, International Mobile Subscriber Identifier (IMSI)) stored in a subscriber identification module 2296.

The antenna module 2297 may transmit or receive signals and/or power to and from the outside (other electronic apparatuses, etc.). The antenna may include a radiator having a conductive pattern formed on a substrate (printed circuit board (PCB), etc.). The antenna module 2297 may include one or a plurality of antennas. When a plurality of antennas is included in the antenna module 2297, an antenna suitable for a communication method used in a communication network, such as the first network 2298 and/or the second network 2299 from among the plurality of antennas may be selected by the communication module 2290. Signals and/or power may be transmitted or received between the communication module 2290 and another electronic apparatus through the selected antenna. In addition to the antenna, other components (a radio frequency integrated circuit (RFIC), etc.) may be included as a part of the antenna module 2297.

Some of the components are connected to each other through a communication method between peripheral devices (a bus, a General Purpose Input and Output (GPIO), a Serial Peripheral Interface (SPI), a Mobile Industry Processor Interface (MIPI), etc.), and may interchange signals (commands, data, etc.).

The command or data may be transmitted or received between the electronic apparatus 2201 and the external electronic apparatus 2204 through the server 2208 connected to the second network 2299. The other electronic apparatuses 2202 and 2204 may be the same or different types of electronic apparatus 2201. All or some of operations performed in the electronic apparatus 2201 may be performed in one or more of the other electronic apparatuses 2202, 2204, and 2208. For example, when the electronic apparatus 2201 needs to perform a function or service, the electronic apparatus 2201 may request one or more other electronic apparatuses to perform part or all function or service instead of executing the function or service itself. One or more other electronic apparatuses receiving the request may execute an additional function or service related to the request, and transmit a result of the execution to the electronic apparatus 2201. For this purpose, cloud computing, distributed computing, and/or client-server computing technologies may be used.

Referring to FIG. 13, the camera module 2280 may include a lens assembly CM10, a flash CM20, an image sensor CM30, an image stabilizer CM40, a memory CM50 (buffer memory, etc.), and/or an image signal processor CM60.

The image sensor CM30 may include a thermal image sensor using the infrared ray sensors 100 described above, for example, the thermal image sensor 1000 described with reference to FIGS. 1 to 11. The image sensor CM30 may be implemented as a Charged Coupled Device (CCD) sensor and/or a Complementary Metal Oxide Semiconductor (CMOS) sensor in addition to a sensor using the infrared ray sensors 100 described above.

The lens assembly CM10 may collect light emitted from an object that is an image capturing object. The lens assembly CM10 may form an optical image on the image sensor CM30 by focusing light from an object. When the thermal image sensor 1000 is applied as the image sensor CM30, the lens assembly CM10 focuses light (e.g., infrared rays radiated from an object), and forms an optical image on the thermal image sensor 1000. The camera module 2280 may include a plurality of lens assemblies CM10, and in this case, the camera module 2280 may be a dual camera, a 360-degree camera, or a spherical camera. Some of the plurality of lens assemblies CM10 may have the same lens properties (angle of view, focal length, auto focus, F number, optical zoom, etc.) or different lens properties. The lens assembly CM10 may include a wide-angle lens or a telephoto lens.

The flash CM20 may emit light used to enhance light emitted or reflected from an object. The flash CM20 may include one or a plurality of light-emitting diodes (Red-Green-Blue (RGB) light emitting diode (LED), White LED, Infrared LED, Ultraviolet LED, etc.), and/or an Xenon Lamp. The flash CM20 may provide light suitable for an operating wavelength band of the image sensor CM30. For example, visible light, near infrared light, or infrared light may be provided.

The image stabilizer CM40 may move one or a plurality of lenses or the image sensor CM30 included in the lens assembly CM10 in a specific direction in response to movement of the camera module 2280 or the electronic apparatus 2201 including the same, or may compensate for negative effects caused by motion by controlling the operating characteristics of the image sensor CM30 (adjustment of read-out timing, etc.). The image stabilizer CM40 may detect movement of the camera module 2280 or electronic apparatus using a gyro sensor or an acceleration sensor disposed inside or outside the camera module 2280. The image stabilizer CM40 may be optically implemented.

The memory CM50 may store some or all data of an image acquired through the image sensor CM30 for the next image processing work. For example, when a plurality of images are acquired at high speed, the memory CM50 may store the acquired original data (Bayer-patterned data, high-resolution data, etc.) in the memory (CM50) and display only low-resolution images, and then, may be used to transfer the selected (user selection, etc.) image to the image signal processor CM60. The memory CM50 may be integrated into the memory 2230 of the electronic apparatus 2201 or configured as a separate memory operated independently.

The image signal processor CM60 may perform image processing on images acquired through the image sensor CM30 or image data stored in the memory CM50.

The image processing may include, in addition to the above, depth map generation, 3D modeling, panorama generation, feature point extraction, image synthesis, and/or image compensation (noise reduction, resolution adjustment, brightness adjustment, blurring, sharpening, softening, etc.). The image signal processor CM60 may perform control (exposure time control, read-out timing control, etc.) for components (image sensor CM30, etc.) included in the camera module 2280. The image processed by the image signal processor CM60 may be stored again in the memory CM50 for further processing or provided to external components of the camera module 2280 (the memory 2230, the display device 2260, the electronic apparatus 2202, the electronic apparatus 2204, the server 2208, etc.). The image signal processor CM60 may be integrated into the processor 2220 or configured as a separate processor that operates independently of the processor 2220. When the image signal processor CM60 is configured as a processor separate from the processor 2220, an image processed by the image signal processor CM60 may be displayed through the display device 2260 after performing an additional image processing by the processor 2220.

The electronic apparatus 2201 may include a plurality of camera modules 2280 each having different properties or functions. In this case, one of the plurality of camera modules 2280 may be a wide-angle camera and the other may be a telephoto camera. One of the plurality of camera modules 2280 may be a front camera and the other may be a rear camera. The plurality of camera modules 2280 may include a visible light camera, an infrared ray camera, an ultraviolet camera, or a 3D camera.

The thermal image sensor (e.g., the thermal image sensor 1000 of FIG. 11) according to embodiments may be applied to various electronic apparatuses.

The thermal image sensor 1000 according to embodiments may be applied to a mobile phone or smart phone, a tablet or smart tablet, a digital camera or camcorder, a notebook computer, a television or a smart television, and the like. For example, the electronic apparatuses described above may obtain temperature information of an object based on detected information of the thermal image sensor 1000 or display a thermal image of the object through a display device as necessary.

In addition, the thermal image sensor 1000 may be applied to a smart refrigerator, a security camera, a robot, a medical camera, and the like. For example, a smart refrigerator may automatically recognize a temperature of food in the refrigerator using the thermal image sensor 1000 and notify the user through a smart phone. A security camera may provide a thermal image and may recognize objects or people in an image even in a dark environment. A robot may provide thermal images by being deployed in a disaster or industrial site where people cannot directly access them. A medical camera may provide a thermal image for diagnosis or surgery.

Also, the thermal image sensor 1000 may be applied to vehicles. A vehicle may include a plurality of vehicle cameras disposed in various locations. Some of the plurality of vehicle cameras may be cameras that acquire visible light images, and some may be cameras that acquire thermal images for nighttime use. A vehicle may provide a driver with various information about interior or surroundings of the vehicle using a plurality of in-vehicle cameras, and may provide information necessary for autonomous driving by automatically recognizing an object or person in an image.

In addition to this, the thermal image sensor 1000 described above may be provided in a personal digital assistant (PDA), a laptop, a personal computer (PC), consumer electronics, a security camera, a military camera, a medical camera, an Internet of Things (IoT) device, a virtual reality device, an augmented reality device, a real device, or the like. Using the cameras installed in these devices, images may be acquired in various environments, such as a dark environment or an environment inaccessible to humans, and objects in the images may be automatically identified. In addition, in an augmented reality device, a user environment may be recognized and an additional image suitable for the user environment may be provided.

According to embodiments, the difficulty in manufacturing an infrared ray sensor may be reduced by employing an absorption layer having a relatively thick nanostructure.

According to embodiments, a height of the resonant cavity may be reduced by employing an absorption layer having a relatively thick nanostructure.

An infrared ray sensor and an electronic apparatus including the same have been described with reference to the embodiments shown in the drawings. It will be understood by those of ordinary skill in the art that various changes in form and details may be made therein without departing from the spirit and scope of the disclosure. Therefore, the embodiments should be considered in descriptive sense only and not for purposes of limitation. The scope of the disclosure is defined not by the detailed description of the disclosure but by the appended claims, and all differences within the scope will be construed as being included in the disclosure.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An infrared ray sensor comprising:
a substrate;
a reflective layer on an upper surface of the substrate; and
a composite layer comprising:
an absorption layer comprising a nanostructure and configured to absorb light energy, and
a sensing layer comprising a plurality of temperature sensing cells,
wherein the composite layer is above the upper surface of the substrate, and
wherein the infrared ray sensor further comprises a resonant cavity between the composite layer and the reflective layer.

2. The infrared ray sensor of claim 1, wherein a height of the resonant cavity is less than ¼ of a wavelength of incident light.

3. The infrared ray sensor of claim 1, wherein a height of the resonant cavity is about 2 μm or less.

4. The infrared ray sensor of claim 1, wherein a height of the resonant cavity is between about 0.5 μm to about 1.5 μm.

5. The infrared ray sensor of claim 1, wherein the absorption layer further comprises a first dielectric layer, and
wherein the nanostructure is located inside the first dielectric layer.

6. The infrared ray sensor of claim 1, wherein the nanostructure comprises a metal, a metal oxide, or a metal nitride.

7. The infrared ray sensor of claim 1, wherein a height of the nanostructure is about 5 nm or more.

8. The infrared ray sensor of claim 1, wherein a height of the nanostructure is between about 10 nm to about 60 nm for light in a wavelength range of about 8 μm to about 14 μm.

9. The infrared ray sensor of claim 1, wherein the nanostructure comprises a plurality of nano-disks.

10. The infrared ray sensor of claim 1, wherein the nanostructure comprises a plurality of nano-rings.

11. The infrared ray sensor of claim 1, wherein the sensing layer further comprises:
a plurality of upper electrodes above the plurality of temperature sensing cells and connecting the plurality of temperature sensing cells in series, and
a plurality of lower electrodes under the plurality of temperature sensing cells and connecting the plurality of temperature sensing cells in series.

12. The infrared ray sensor of claim 11, wherein the sensing layer further comprises a second dielectric layer, and
wherein a resistance circuit located inside the second dielectric layer, the resistance circuit comprising the plurality of temperature sensing cells, the plurality of upper electrodes, and the plurality of lower electrodes.

13. The infrared ray sensor of claim 12, further comprising an anchor that supports the composite layer with respect to the substrate,
wherein the resistance circuit comprises a first end unit and a second end unit, and
wherein the first end unit and the second end unit of the resistance circuit are each connected to the substrate through the anchor by a pair of connection units.

14. The infrared ray sensor of claim 13, wherein the sensing layer has a rectangular plane shape, and
wherein a length of each pair of connection units is greater than a length of one side of the sensing layer.

15. The infrared ray sensor of claim 11, wherein the plurality of temperature sensing cells each comprises at least one magnetic tunneling junction (MTJ) element.

16. The infrared ray sensor of claim 11, wherein the plurality of temperature sensing cells each comprise amorphous silicon.

17. The infrared ray sensor of claim 1, wherein the absorption layer is on at least one of lower sides of the sensing layer and upper sides of the sensing layer.

18. The infrared ray sensor of claim 1, wherein the sensing layer is between a pair of absorption layers.

19. A thermal image sensor comprising:
a sensor array comprising a plurality of light sensing elements, each of the plurality of light sensing elements comprising an infrared ray sensor; and
a processor configured to read a photoelectricity signal generated in each of the plurality of light sensing elements,
wherein the infrared ray sensor comprises:
a substrate;
a reflective layer on an upper surface of the substrate; and
a composite layer comprising:
an absorption layer comprising a nanostructure and configured to absorb light energy, and
a sensing layer comprising a plurality of temperature sensing cells,
wherein the composite layer is above the upper surface of the substrate, and
wherein the infrared ray sensor further comprises a resonant cavity between the composite layer and the reflective layer.

20. An electronic apparatus comprising:
a lens assembly configured to form an optical image by focusing light radiated from an object; and
a thermal image sensor configured to convert the optical image formed in the lens assembly into an electrical signal,
wherein the thermal image sensor comprises:
a sensor array comprising a plurality of light sensing elements, each of the plurality of light sensing elements comprising an infrared ray sensor; and
a processor configured to read a photoelectricity signal generated in each of the plurality of light sensing elements,
wherein the infrared ray sensor comprises:
a substrate;
a reflective layer on an upper surface of the substrate; and
a composite layer comprising:
an absorption layer comprising a nanostructure and configured to absorb light energy; and
a sensing layer comprising a plurality of temperature sensing cells,
wherein the composite layer is above the upper surface of the substrate, and
wherein the infrared ray sensor further comprises a resonant cavity between the composite layer and the reflective layer.

* * * * *